United States Patent [19]

Schub

[11] 4,324,039
[45] Apr. 13, 1982

[54] APPARATUS AND METHOD OF DELIVERING DEPOLARIZATION MIX INTO A DRY CELL CAN

[75] Inventor: Leonard Schub, Stamford, Conn.

[73] Assignee: Wonder Corporation of America, Inc., South Norwalk, Conn.

[21] Appl. No.: 142,666

[22] Filed: Apr. 22, 1980

[51] Int. Cl.³ .................... H01M 2/36; B23P 19/04; B65B 1/24

[52] U.S. Cl. ................................. 29/623.1; 29/730; 141/80; 429/133

[58] Field of Search ............... 29/623.1, 623.2, 730; 141/12, 80, 73, 71, 263; 429/166–173, 224, 133

[56] References Cited

U.S. PATENT DOCUMENTS

| | | | |
|---|---|---|---|
| 1,137,030 | 4/1915 | Smith | 429/166 |
| 1,403,409 | 1/1922 | Hazelett | 29/623.1 |
| 1,552,395 | 9/1925 | Deibel et al. | 29/623.2 |
| 1,654,038 | 12/1927 | Deibel | 429/133 |
| 1,657,101 | 1/1928 | Zeitlin | 29/730 |
| 1,780,982 | 11/1930 | Schmidt | 29/730 |
| 3,198,221 | 8/1965 | Orlando | 141/263 |

FOREIGN PATENT DOCUMENTS 55-13383  4/1980  Japan ................................. 29/623.1

Primary Examiner—Daniel C. Crane
Attorney, Agent, or Firm—Stephen E. Feldman; Marvin Feldman; Jules L. Chaboty

[57] ABSTRACT

A battery assembly apparatus comprises a device for delivering depolarization mix into a dry cell can. Another device inserts a carbon rod into the depolarizing mix in the dry cell can. A mix washer insertion device consolidates the depolarizing mix by pushing a mix washer against the depolarizing mix.

10 Claims, 7 Drawing Figures

APPARATUS AND METHOD OF DELIVERING DEPOLARIZATION MIX INTO A DRY CELL CAN

BACKGROUND OF THE INVENTION

While the invention is subject to a wide range of applications, it is especially suited for use as an apparatus and method for making dry cells and will be particularly described in that connection.

In producing dry cell batteries of substantially uniform performance characteristics and of a uniform quality, it is necessary to place a uniform quantity of depolarizing mix in each cell can and to compact the mix uniformly. It is also desirable to discharge most of the air from the can so that it will not create internal resistance in the cell can.

The general technique of constructing a dry cell battery follows. A paper liner is formed and inserted into a cell can. Next a paper washer is inserted into the can. This washer is initially positioned in the can near its upper opened end. The side walls of the cup-shaped washer have sufficient inherent elasticity to force the paper liner into close proximity with the inner wall of the can as the washer is moved downward into the can. After the washer is placed into the can, the can is advanced over an extruder nozzle until the end of the nozzle reaches nearly to the bottom of the can. This movement pushes the washer to the bottom of the can as explained in U.S. Pat. No. 3,198,221 to Orlando. The nozzle delivers into the can, by way of example, a depolarizing mix of manganese dioxide, conductive carbon, suitable electrolyte salts, such as ammonium chloride and zinc chloride and enough water to make a pasty mass as required.

The extruder nozzle is formed of a relatively thin walled tube with an outside diameter nearly the same as the internal diameter of the can. The can is supported by a spring biased support device which allows the can to move off the nozzle against the force of the spring as the depolarizing mix enters into the can.

More specifically, when the pressure created by the depolarizing mix being delivered to the can reaches the spring pressure, the can moves back off the nozzle as further mix enters the can. Means are provided so that the can stops moving just before the last of the mix is delivered to the can. The last of the mix, delivered to the can after its movement has been arrested, causes a consolidation of the material in the can to a desired pressure and predetermined height.

In using the extruder as described in the previously mentioned patent, the spring of the support device is set to achieve good consolidation of the mix as the latter entered the can. The amount of consolidation is very important. If a very tight consolidation is attempted at the extruder, it often leads to a build up of the material around the sides of the extruder nozzle and generally messy operation. On the other hand, if there is little or no consolidation, the slug of mix will not adequately wet the paper liner.

Thus, the goal or optimum condition is where the mix is consolidated without squeezing excess liquid out of the mix to overly wet the paper liner and paper washer and produce cells of inconsistent quality and varying amperage.

The cell is next moved to a station downstream from the extruder where a cardboard mix washer is inserted to very loosely bear against the mix. The cell is then moved to the next station were a carbon rod is driven through the mix washer into the depolarizing mix. The rod displaces a portion of the mix and forces it outward towards the sides of the can and upward against the mix washer. The battery continues to move downstream and is completed, as explained below. In some instances, the washer is loose after this operation, and/or the mix is not properly consolidated. The result is batteries with varying operational characteristics and amperages.

It is an object of the present invention to provide an apparatus and method for delivering depolarizing mix into a dry cell can in a manner to substantially obviate one or more of the limitations and disadvantages of the described prior arrangements.

It is a further object of the present invention to provide a method and apparatus for delivering depolarizing mix into a dry cell can whereby uniform consolidation of the mix can be achieved in substantially every battery.

It is a further object of the present invention to provide a method and apparatus for delivering depolarizing mix into a dry cell can whereby a mix washer is used to consolidate the depolarizing mix.

SUMMARY OF THE INVENTION

Accordingly, there has been provided a battery assembly apparatus comprising a device for delivering depolarizing mix into a dry cell can. Another device inserts a carbon rod into the depolarizing mix in the dry cell can. A mix washer insertion device consolidates the depolarizing mix by pushing a mix washer against the depolarizing mix.

One specific embodiment includes the method and apparatus for delivering depolarizing mix into a dry cell can, inserting a carbon rod into the can, inserting a mix washer and reconsolidating the depolarization mix.

For a better understanding of the present invention together with other and further objects thereof, reference is had to the following description, taken in connection with the accompanying drawings, while its scope will be pointed out in the appended claims.

DESCRIPTION OF THE PREFERRED EMBODIMENT OF THE INVENTION

Figure 1:
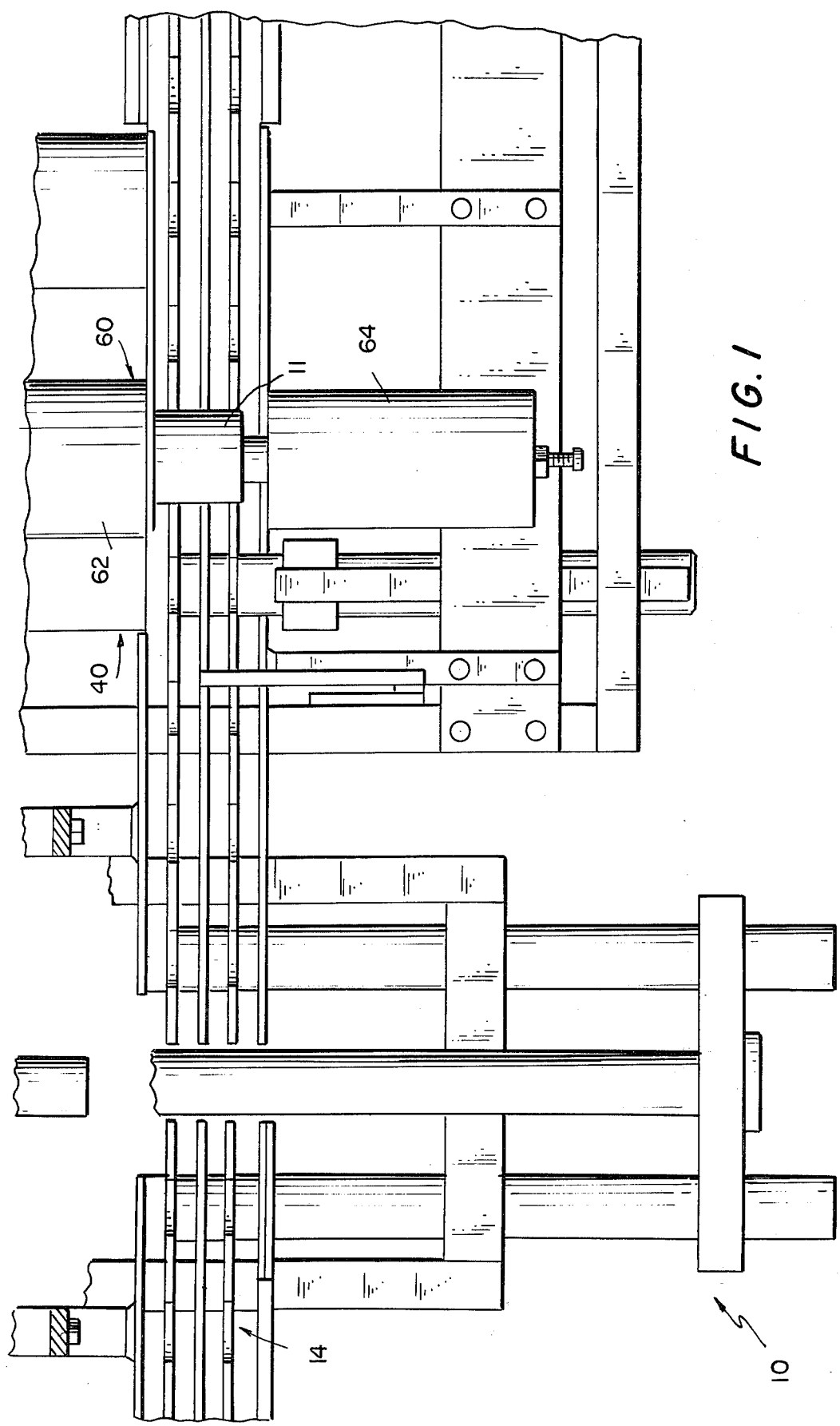
FIG. 1 is a top view of a battery assembly apparatus in accordance with the present invention.

The illustration of FIG. 1 is a partial illustration of a complete dry cell battery assembly machine 10 which can automatically produce paper-lined batteries. The details of the invention are described later in the specification while the general system is described directly below.

At a first station (not shown) zinc battery cans, 11, fed from a can feed hopper, are correctly positioned on a walking beam 9 with the open end of the can always facing the battery assembly stations of the machine.

Prior to being fed onto the walking beam, randomly oriented cans are carried from the can feed hopper into an orientation mechanism (not shown) that directs the can with its open end in one direction onto the walking beam. The cam-driven walking beam carries the cans and precisely positions every can at each of the successive battery assembly stations.

At the next station (not shown), a paper cylinder, formed by passing paper through a series of forming rings with the overlapping edges is correctly oriented and partially inserted into the can. The cylindrical liner is cut by the pinching action of dies. The can carries the liner along and the liner is pushed completely into the can before it gets to a bottom washer station.

At the third station (not shown), a paper bottom washer is blanked from a feeding roll, and inserted partially into the can. On entry into the can, the bottom washer engages the top end of the liner, and drives the liner downward until the bottom edge of the liner reaches the base of the can. The bottom washer then enters the cylindrical liner and spreads the liner into intimate contact with the wall of the can. The bottom washer is inserted within the liner to a point near the top edge of the liner.

The can is next carried by the walking beam to the mix depolarizer injection station 12. As the can enters the mix station, the can hold-down roller is lifted and the can is moved over the mix extruder nozzle. The edge of the nozzle engages the edge of the bottom washer and drives the washer practically to the base of the can as the can comes to a momentary rest in its position over the nozzle. The mix is then injected into the can and seats the bottom washer at the base of the can. Then the can is driven rearward along the nozzle as the mix spreads itself against the lined can until the can comes to rest against a stop which determines the height of the mix. The height is adjustable and should be set in accordance with the seal components and the amount of air space desired within the cell. The mix is injected and compacted to a predetermined density by the single stroke of the machine.

At station 40, a carbon electrode is positioned and inserted into the mix near the botton of the can. After this operation, the following stations may be provided in a different order and in some cases optional depending upon the style of battery being produced.

At the next mix insert station 60, the paper mix washer may then be inserted. This washer is identical to the paper bottom washer except that it has a hole punched in its center to accomodate the carbon electrode. At the next assembly station a plastic seal washer may be inserted. The washer is delivered down a chute, from its hopper, to its positioning station and then driven over the carbon electrode. There is a hole in the center of the plastic seal to accept the carbon. The can continues travelling to a brass terminal assembly station where the cap is positioned and driven over the top of the carbon electrode. The last battery assembly station may be the can crimping station where the battery is completed.

Figure 2:
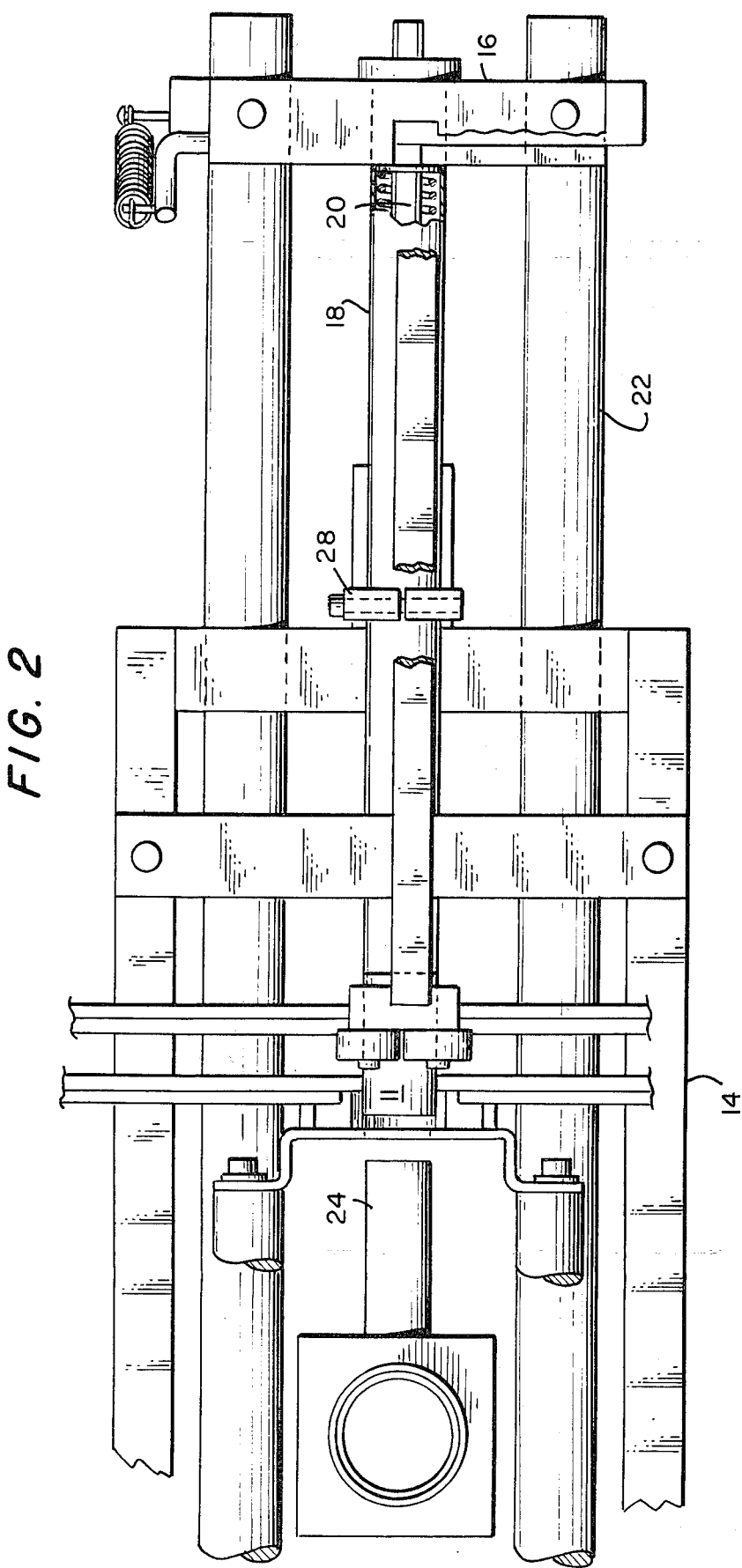
FIG. 2 is a top view of the extrusion portion of the assembly apparatus.
Figure 3:
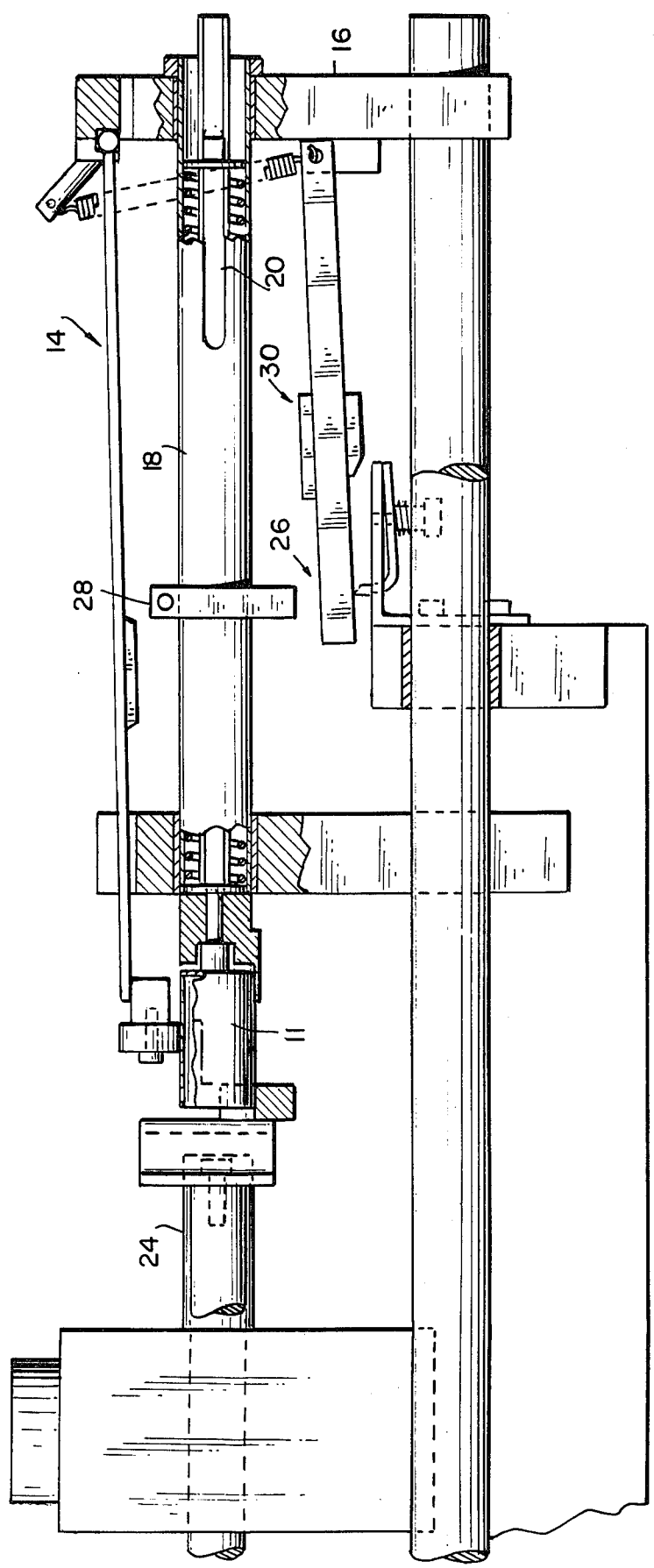
FIG. 3 is a side view of the extrusion portion of the assembly apparatus.

Referring to FIGS. 2 and 3, there is illustrated a conventional extruder apparatus 14 of the type described in U.S. Pat. No. 3,198,221 which is located at station 12. The depolarizing mix is delivered into a dry cell can 11 in a series of steps. A cell can 11 is positioned on a carrier of the extruder apparatus 12. The carrier includes a reciprocating frame member 16, a hollow plunger body 18 having a spring biased plunger 20 associated with the frame member 16 and carrier actuating structure 22 for reciprocating the carrier through a forward stroke and a rearward stroke. The cell can is positioned on an extruder nozzle 24 at a predetermined position close to the bottom of the can by moving the frame member 16 through a forward stroke toward the nozzle 24.

A set charge of depolarizing mix, determined by an adjusting device 26 on the carrier, is delivered through the nozzle. The mix fills the can and causes the can to back off the nozzle and retract the spring biased plunger. The adjusting device 26 comprises an adjustable collar 28 fixed securely on the plunger body and a plunger stop element 30. Device 26 prevents further movement of the can off the nozzle when the set charge has been delivered. Finally, an additional charge of depolarizing mix is delivered through the nozzle after the plunger stop element contacts the collar and the movement of the can has stopped. The additional charge consolidates the mix to a desired pressure and to a predetermined height in the can. The can is finally removed from the apparatus carrier as the carrier moves away from the nozzle during the rearward stroke.

When a set charge of depolarizing mix is delivered through the nozzle, the mix enters having the diameter of the nozzle and then the slug of material breaks up and is reshaped to fill the can. The amount of consolidation of the mix when the primary charge is delivered is very important. The mix must be compressed to an extent that it remains in the can and does not attach itself to the nozzle as the can moves off of nozzle. Also, since the mix contains water, it is important that the mix is not compressed so that excess water is forced out. If too much liquid goes into the liner or washer in the can, the finished dry cell would have less than optimum operating characteristics. In order to provide the proper consolidation as required for an efficient dry cell, the spring located in the plunger is adjusted to allow the can to back off the nozzle as the mix is consolidated to the desired pressure. The effect is to substantially wet the paper without causing the water in the mix to be completely forced out and also provide a compression of the mix that allows the mix to detach itself from the nozzle. In addition, any air located in the can with the mix is expelled and replaced with the additional mix.

Figure 4:
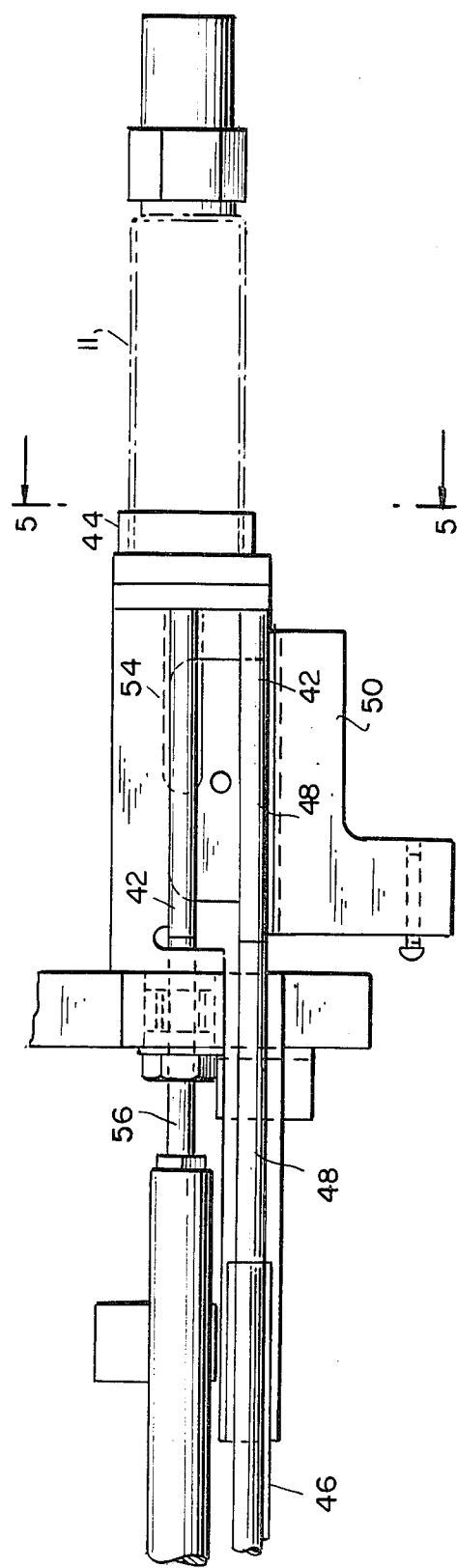
FIG. 4 is the top view of a carbon rod insertion portion of the assembly apparatus.
Figure 5:
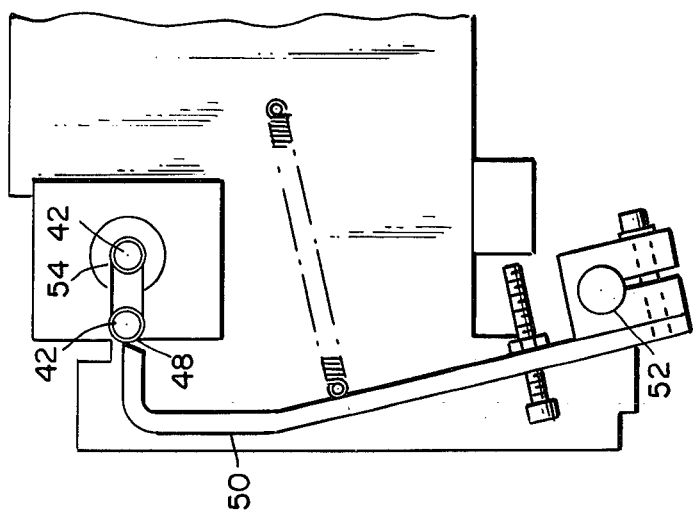
FIG. 5 is a view through 5—5 of FIG. 4.

Referring to FIGS. 4 and 5, there is illustrated a device 40 for inserting a carbon rod 42 into a dry cell can 11 containing depolarizing mix. The can 11 arrives from station 12 and is positioned on saddle 44. The carbon rods may be delivered through a tube 46 to a carbon rod delivery channel 48. An arm 50 rotates about its base 52 and moves the carbon rod 42 from the delivery channel 48 to an exit bore 54. Then a plunger 56 moves forward and drives the carbon rod from the exit bore 54 into the center and practically to the bottom of can 11. When the carbon rod is inserted, some of the mix becomes displaced. Thus it is necessary to consolidate the mix to the proper density again. This reconsolidation may occur at the mix washer insert station 60 as described below.

Figure 7:
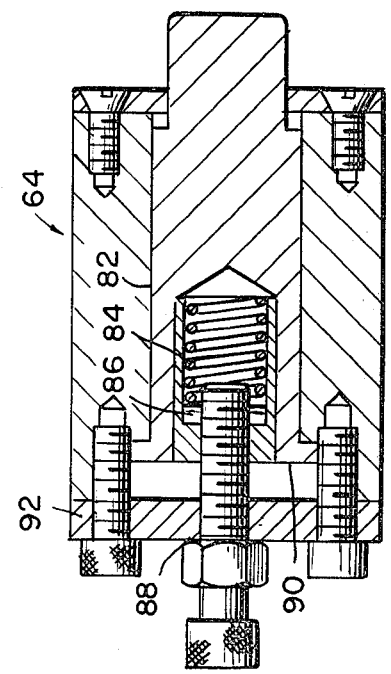
FIG. 7 is a side view of a compression assembly.
Figure 6:
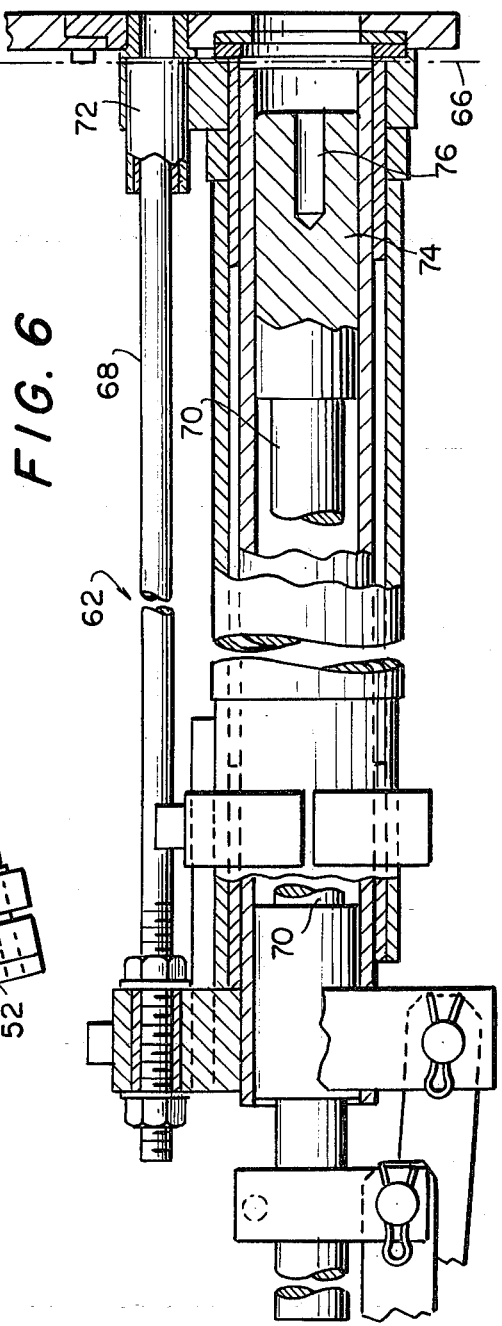
FIG. 6 is a side view, partly in cross-section of a mix washer insertion portion of the present invention.

Referring to FIGS. 1, 6 and 7, a mix washer insert station is illustrated with a mix washer insert device 62, a compression assembly 64 and a can 11. The can 11 is delivered to the mix washer insert station 60 and is positioned as illustrated in FIG. 1. A strip of washer paper 66, such as cardboard, is delivered to the insert device 62 by a paper feed (not shown). As the paper 66 passes through the front portion of the insert device 62, plungers 68 and 70 are driven forward towards the front of the device. The plunger 68 has a punch 72 which cuts a hole in paper 66 to a size which fits over a carbon rod. A punch 74, located on the end of plunger 70, cuts the paper into a circular washer and drives the washer into the top of the can. A bore 76, located in the head of the punch 74 is sized to fit over the carbon rod as the punch enters the can 11.

The compression assembly 64 as seen in FIG. 7, is comprised of a compression body 79 having a plunger 80 mounted in a bore 82. The bore includes an elongated section 83 having a first diameter and a shorter adjacent section 85 having a second diameter larger than said first diameter. A wall 92 is formed between sections 83 and 85. A rear closure element 93 closes the section 85 and a front closure element 94 closes the section 83. The plunger 80 has a main body 87 which is carried in section 83. A rear section 90 of body 87 can move between wall 92 and element 93. A front section of the plunger protrudes out of bore 83 through element 94. The plunger 80 also includes a bore 95 opening towards element 93. A rod 96 is threaded through element 93 and includes a plug end 97. A coil spring 98 is disposed in the bore 82 with one end of the spring in engagement with the closed end of bore 95 and the other end engaging plug end 97.

The end of the plunger 80 forms a backup member to receive the closed base of the dry cell can 11. The spring 98 may be adjusted to regulate the force exerted by the plunger 80 on the can by moving rod 96 in or out of bore 82. The section 90 may seat against a rear closure element 93 to completely stop the rearward movement of the plunger 80 while the forward movement is limited by section 90 engaging wall 92.

The combination of the mix washer insert device and the compression assembly provides a new important advance over the prior art. In the past, the mix washer was inserted after the carbon rod so as to barely touch the mix. The mix washer was specifically not pushed in to reconsolidate the mix displaced by the insertion of the carbon rod because, if too much force was exerted, the mix would have a tendency to go through the center hole of the washer or possibly around the edges and form a messy, low quality battery. This problem has been rectified with the present arrangement of the mix washer insert station 60. When the hole plunger 74 reciprocates through a forward stroke to push a mix washer into the open end of a can 11, the spring loaded plunger 80 supports the back of the can and moves back against the bias of the spring 98 so that the washer is able to properly reconsolidate the mix which is located in the can. The amount of reconsolidation can be adjusted by changing the force of the coil spring through the adjustment of rod 96.

Although the preferred embodiment has been illustrated, the compression assembly 64 may be constructed in any desired manner so that the plunger 80 is biased by an adjustable spring force and can have its rearward movement limited. For instance, the rod may be elongated so that the plunger 80 contacts the rod to limit its movement. In addition, it is also within the scope of the present invention to reverse the parts and spring bias the punch 74 and replace the compression assembly with a solid backup for the rear of the cans 11.

The can is now ready to move downstream to optional stations which may include placing a brass tip on the end of the electrode, sealing the top of the can with a plastic cover and/or crimping the can as required.

It can thus be seen by one skilled in the art that there has been provided an apparatus and method for delivering depolarizing mix into a dry cell can where uniform consolidation of the mix can be achieved and the mix washer can be used to achieve reconsolidation.

While there has been described what is at present considered to be the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A battery assembly apparatus comprising:
   (a) means at a first station along an assembly line for delivering depolarizing mix to a dry cell can,
   (b) means at a second station downstream from said first station and along said assembly line for inserting a carbon rod into said dry cell can containing depolarizing mix, and
   (c) mix washer insertion means at a third station downstream from said second station and along said assembly line for reconsolidating said depolarizing mix during the insertion of a mix washer after said carbon rod has been inserted according to paragraph (b), said mix washer contacting and producing uniform reconsolidation of the mix to the proper density by said mix washer insertion, said mix washer insertion means including compression means for exerting a bias against and for supporting the bottom of the can, while allowing the can to move, as the mix washer is inserted into the can and pushes against the mix.

2. The battery assembly apparatus of claim 1 wherein said compression means includes a compression body having a bore, a plunger reciprocally received in said bore, biasing means in said compression body for biasing said plunger towards said can.

3. The battery assembly apparatus of claim 2 wherein said biasing means is a spring disposed between said plunger and said compression body.

4. The battery assembly apparatus of claim 2 wherein said compression means includes adjustment means for changing the bias of said biasing means.

5. The battery assembly apparatus of claim 1 wherein said washer insertion means includes a mix washer insertion device disposed opposite said compression means for inserting a mix washer into the top of said can.

6. The battery assembly apparatus of claim 5 wherein said assembly line includes means for moving the dry cell can from the means for delivering depolarizing mix to the means for inserting a carbon rod to the mix washer insertion means.

7. The method of delivering depolarizing mix into a dry cell can comprising the steps of:
   (a) delivering a depolarizing mix into a dry cell can;
   (b) inserting a carbon rod into the dry cell can containing depolarizing mix; and
   (c) inserting a mix washer into the depolarizing mix filled dry cell can and against the depolarizing mix, while exerting a bias against and supporting the bottom of said can while also allowing said can to move as said mix washer is inserted into said can, so that said mix washer contacts, pushes against and uniformly reconsolidates said depolarizing mix to the proper density.

8. The method of claim 7 wherein the mix washer inserting step is performed so that the bias is exerted against the bottom of the can by compressing the bottom of the can utilizing a compression body having a bore, a plunger reciprocally received in said bore, and biasing means in said compression body for biasing said plunger towards said can.

9. The method of claim 8 in which the biasing means is a spring disposed between the plunger and the compression body.

10. The method of claim 8 in which the biasing means is adjustable so that the bias of the biasing means is changeable.

* * * * *